United States Patent
Dombrowski et al.

(10) Patent No.: US 9,932,268 B2
(45) Date of Patent: Apr. 3, 2018

(54) USE OF POLYURETHANE POWDER AS INNER ADDITIVE OF REDISPERSIBLE POLYMER POWDER

(71) Applicant: Dow Global Technologies LLC, Midland, MI (US)

(72) Inventors: Juergen Dombrowski, Halle (DE); Hartmut Kuehn, Halle (DE); Margarita Perello, Duebendorf (CH); Sonja Scharlemann, Wedemark (DE)

(73) Assignee: Dow Global Technologies LLC, Midland, MI (US)

( * ) Notice: Subject to any disclaimer, the term of this patent is extended or adjusted under 35 U.S.C. 154(b) by 230 days.

(21) Appl. No.: 14/353,825

(22) PCT Filed: Oct. 24, 2012

(86) PCT No.: PCT/US2012/061578
§ 371 (c)(1),
(2) Date: Apr. 24, 2014

(87) PCT Pub. No.: WO2013/063036
PCT Pub. Date: May 2, 2013

(65) Prior Publication Data
US 2014/0288202 A1    Sep. 25, 2014

Related U.S. Application Data

(60) Provisional application No. 61/552,737, filed on Oct. 28, 2011.

(51) Int. Cl.
| | |
|---|---|
| *C04B 16/08* | (2006.01) |
| *C04B 24/24* | (2006.01) |
| *C04B 28/02* | (2006.01) |
| *C04B 40/00* | (2006.01) |
| *C08J 3/00* | (2006.01) |
| *C08J 3/05* | (2006.01) |
| *C08J 3/12* | (2006.01) |
| *C04B 103/00* | (2006.01) |

(52) U.S. Cl.
CPC ............ *C04B 16/082* (2013.01); *C04B 28/02* (2013.01); *C04B 40/0039* (2013.01); *C08J 3/005* (2013.01); *C08J 3/05* (2013.01); *C08J 3/12* (2013.01); *C04B 2103/0057* (2013.01); *C08J 2300/12* (2013.01); *C08J 2309/06* (2013.01); *C08J 2331/04* (2013.01); *C08J 2375/04* (2013.01)

(58) Field of Classification Search
None
See application file for complete search history.

(56) References Cited

U.S. PATENT DOCUMENTS

| | | | |
|---|---|---|---|
| 4,245,054 A | 1/1981 | Hohwiller | |
| 5,472,498 A * | 12/1995 | Stephenson | C04B 20/1029 106/218 |
| 5,478,865 A * | 12/1995 | Chang | 521/49 |
| 5,877,138 A * | 3/1999 | Ditze et al. | 510/280 |
| 5,989,371 A * | 11/1999 | Nishimoto | 156/73.6 |
| 6,653,372 B1 | 11/2003 | Pakusch et al. | |
| 7,699,929 B2 * | 4/2010 | Guevara | C04B 16/08 106/644 |
| 2002/0129745 A1* | 9/2002 | Semmens | B32B 13/04 106/802 |
| 2009/0054588 A1 | 2/2009 | Maier et al. | |
| 2010/0314111 A1* | 12/2010 | Karcher et al. | 166/293 |
| 2012/0202901 A1 | 8/2012 | Karcher et al. | |

FOREIGN PATENT DOCUMENTS

| | | | |
|---|---|---|---|
| CN | 101921091 A | 12/2010 | |
| DE | 19731485 A1 | 2/1998 | |
| GB | 1517834 A | 7/1978 | |
| JP | 2011099024 A | 5/2011 | |
| WO | 9919386 A1 | 4/1999 | |
| WO | 2004055086 A1 | 7/2004 | |
| WO | WO 2009061016 A1 * | 5/2009 | |
| WO | WO-2009099717 A2 * | 8/2009 | ......... C04B 24/2641 |
| WO | 2010027058 A1 | 3/2010 | |
| WO | 2010151431 A1 | 12/2010 | |

OTHER PUBLICATIONS

Trycite Polystyrene Films. Dow Chemical Company. Apr. 2001.*
Parrish, Dennis. Emulsion Polymerization. http://pslc.ws/macrog/level4.htm. As viewed on Oct. 28, 2015.*

* cited by examiner

*Primary Examiner* — Stephen E Rieth
(74) *Attorney, Agent, or Firm* — Andrew Edwin Cox Merriam; Steven W. Mork

(57) ABSTRACT

A powdered polyurethane, preferably a powdered recycled polyurethane rigid foam is co-dried with a water insoluble film-forming polymer to obtain a redispersible polymer powder composite for use in hydraulic binders or cementitious compositions to improve performance of cementitious compositions or mortar, in applications such as cement based the adhesives (CBTA), or external thermal insulating composite systems (ETICS).

7 Claims, No Drawings

USE OF POLYURETHANE POWDER AS INNER ADDITIVE OF REDISPERSIBLE POLYMER POWDER

The present invention relates to redispersible polymer powder compositions or composites which are prepared from a powdered polyurethane, and a film-forming polymer for use in hydraulic hinders, such as cement compositions.

In construction applications, mortars may be prepared with cement, sand, and organic polymer. To reduce shipping costs, the polymer can be shipped and added in dry form as a redispersible polymer powder. Redispersible polymer powders are used as binders to improve the adhesion of cementitious adhesive formulations. The powdered form of the polymer is generally produced by spray drying a liquid polymer composition to obtain a free flowing powder. To perform its function in the application formulation to which it is added, such as concrete, it is desired that in the application formulation the polymer powder is easily redispersible.

Redispersible polymer powders made from emulsion polymers, such as vinyl acetate/ethylene copolymers, styrene/butadiene copolymers, and vinyl acetate/versatic acid vinyl ester copolymers are widely used in various construction applications, such as cement based tile adhesives (CBTA), and self level flooring compounds (SLFC) to improve the mechanical properties of the cementitious composition.

However, different types of performance issues are presented depending upon the polymer used to make the redispersible polymer powder, and the cementitious application for which the redispersible polymer powder is employed. For example, when the chemistry of the polymer used in the redispersible polymer powder is a carboxylated latex, mortar density of the mortar in which it is employed tends to be very low, and the set time for the mortar tends to increase. When the chemistry of the redispersible polymer powder is based on vinyl acetate, then the adhesion after water immersion is generally very limited. Also, to obtain good impact resistance with a cementitious base coat for external thermal insulation systems (ETICS) either the polymer used needs to have a very low Tg (which is very costly to produce as a redispersible polymer powder), or the dosage of the redispersible polymer powder has to be increased significantly.

U.S. Patent Application Publication No. US 2009054588 to Alois Maier et al discloses a fluoromodified admixture, containing isocyanate and urethane and/or urea groups, for use as a liquid or powdery admixture for the permanent hydrophobic and/or oleophobic and/or dirt-repellent finishing of products based on inorganic or hydraulic or mineral binders. According to Maier et al, the fluoromodified admixture may be employed as a liquid or powdery additive or dispersant for aqueous suspensions based on inorganic or hydraulic or mineral binders, such as cement, calcined lime, gypsum [alpha]-hemihydrate, [0006]-hemihydrate-[alpha]/[0007]-hemihydrate), anhydrite (natural anhydrite, synthetic anhydrite, REA anhydrite), geopolymers, and concrete. The fluoromodified admixtures, it is disclosed are surprisingly outstandingly suitable even at a very low dosage for the permanent hydrophobic and/or oleophobic and/or dirt-repellent in-bulk finishing of products based on inorganic or hydraulic or mineral binders, without the fundamental property profile (e.g. compressive and flexural tensile strength) of these products being substantially influenced. In the case of products such as hardened building material compositions based on the fluoromodified admixtures, a markedly lower water absorption (avoidance of frost damage and corrosion) and a suppression of bleeding on the surfaces (avoidance of visual impairment) is observed according to Maier et al. It is also disclosed that in spite of the high fluoromodification an adequate self-dispersibility is afforded, and as a result of the thereby strongly liquefying action of the fluoromodified admixtures, the water/cement value (WIC value) in the case of modified concrete or (dry) mortar systems is markedly lower than in the case of unmodified concrete or (dry) mortar systems. However, the additives of Maier et al require the production of a specific polymer additive for hydrophobization and oleophobization products and are not disclosed as enhancing or improving the performance of redispersible polymer powders such as those made from emulsion polymers, such as vinyl acetatetethylene copolymers, styrene/butadiene copolymers, and vinyl acetateiversatic acid vinyl ester copolymers in various cementitious applications.

The present inventors have sought to solve the problem of providing a single redispersible polymer powder (RDP) which provides excellent adhesion and reduced mortar set time regardless of the polymer from which the RDP was made. The inventors have surprisingly found, that including a powdered polyurethane foam or elastomer as an inner additive of an RD, such as a styrene butadiene RDP a vinylacetate ethylene (VAE) copolymer RDP, or a VAE/vinyl acetate-versatic vinylester (VA-VeoVA) copolymer mixture REP, improves the performance of the RDP in hydraulic binders, such as cement containing adhesives and reinforcement base coat mortar for external thermal insulating composite systems (ETICS). Surprisingly it was found, that a recycled powdered polyurethane and RDP composite increases wet mortar density and still maintains excellent workability and quick open time, quickens setting time, improves impact resistance, and increases adhesion after water immersion.

SUMMARY OF THE INVENTION

The present invention provides a water redispersible polymer powder composition comprised of a co-dried admixture of a water insoluble film-forming polymer, a powdered polyurethane, and optional colloidal stabilizer. The polyurethane may be a foam or an elastomer. The amount of the powdered polyurethane may be from 1% by weight to 99% by weight, preferably from 20% by weight to 70% by weight, more preferably from 40% by weight to 60% by weight, for example 50% by weight, based upon the total weight of the water-redispersible polymer powder composite, or final powder composite. The powdered polyurethane is preferably a ground rigid polyurethane foam, and is preferably a recycled polyurethane foam. The average particle size of the ground polyurethane employed in the present invention may be from 5 microns to 500 microns, for example from 10 microns to 200 microns, preferably from 20 microns to 150 microns, most preferably from 40 microns to 120 microns, for example from 40 microns to 80 microns. The redispersible polymer powder composite may have an exemplary average particle size of from 20 microns to 150 microns, preferably from 20 microns to 90 microns, most preferably from 50 microns to 80 microns. Preferred water insoluble film-forming polymers include a styrene-butadiene copolymer, or a styrene butadiene copolymerized with another copolymer, or a vinylacetate-ethylene copolymer.

Use of the powdered polyurethane as a partial replacement for a redispersible polymer powder (RDP), or as an inner additive for an RDP, in cementitious compositions unexpectedly provides improved performance of cementitious compositions for numerous applications, such as increased wet mortar density with excellent workability and quick open time, quick setting times, improved impact resistance, and increased adhesion after water immersion for the cementitious compositions.

In an aspect of the present invention, a water redispersible polymer powder composite may be produced by drying an aqueous mixture of a water insoluble film-forming polymer and a powdered polyurethane to obtain a water redispersible polymer powder composite, the amount of the powdered polyurethane foam being from 1% by weight to 99% by weight, preferably from 20% by weight to 70% by weight, more preferably from 40% by weight to 60% by weight, for example 50% by weight, based upon the total weight of the water-redispersible polymer powder composite, or final powder composite, the powdered polyurethane foam having an average particle size of from 5 microns to 500 microns, for example from 10 microns to 200 microns, preferably from 20 microns to 150 microns, most preferably from 40 microns to 120 microns, for example from 40 microns to 80 microns, and the redispersible polymer powder composite having an average particle size of from 20 microns to 150 microns, preferably from 20 microns to 90 microns, most preferably from 50 microns to 30 microns.

In another aspect of the present invention, a dry mix formulation, or a cement composition such as a cement based tile adhesive (CBTA) or an external thermal insulating composite system (ETICS), may be produced by admixing cement ingredients with a redispersible polymer powder composite which comprises a co-dried admixture of a water insoluble film-forming polymer and a powdered polyurethane, the amount of the powdered polyurethane being from 1% by weight to 99% by weight, preferably from 20% by weight to 70% by weight, more preferably from 40% by weight to 60% by weight, for example 50% by weight, based upon the total weight of the water-redispersible polymer powder composite, or final powder composite. The amount of the redispersible polymer powder composite employed may be 0.1% by weight to 10% by weight, preferably from 0.5% by weight to 3% by weight, based upon the weight of the dry mix formulation.

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "(meth)acrylate" includes, in the alternative, acrylate and methacrylate, and mixtures thereof.

As used herein, unless otherwise indicated, the phrase "molecular weight" refers to a number average molecular weight as measured in a conventional manner. The number average molecular weight is the ordinary arithmetic mean or average of the molecular weights of the individual macromolecules. It is determined by measuring the molecular weight of n polymer molecules, summing the weights, and dividing by n. The number average molecular weight of a polymer can be determined by gel permeation chromatography, viscometry (Mark-Houwink equation), and all colligative methods like vapor pressure osmometry or end-group determination. For polyvinyl alcohol, the PVH molecular weight, unless otherwise indicated, means the mean weight of the molar masses, Mw, determined by gel permeation chromatography (GPC) combined with static light scattering (absolute method) on re-acetylized specimens. The accuracy of the Mw values is estimated at ±15%.

As used herein, the term "polymer" refers, in the alternative, to a polymer made from one or more different monomer, such as a copolymer, a terpolymer, tetrapolymer, a pentapolymer etc, and may be any of a random, block, graft, sequential or gradient polymer.

As used herein, unless otherwise indicated, the measured glass transition temperature ($T_g$) is used. As used herein the term "calculated $T_g$" refers to the $T_g$ of a polymer calculated by using the Fox equation (T. G. Fox, *Bull. Am. Physics Soc.*, Volume 1, Issue No. 3, page 123 (1956). As used herein the term "measured $T_g$" means a $T_g$ that is measured using differential scanning calorimetry or DSC (rate of heating 10° C. per minute, $T_g$ taken at the midpoint of the inflection.)

As used herein, the phrase "wt. %" stands for weight percent.

As used herein, unless otherwise indicated, the phrase "average particle size", refers to the particle diameter or the largest dimension of a particle in a distribution of powder particles as determined by laser light scattering such that 50 wt, % of the particles in the distribution are smaller than the particle and 50 wt. % of the particles in the distribution are larger than the particle. The particle size distribution may be measured using a Coulter LS 230 particle size analyzer, a product of Beckman Coulter (Brea, Calif.) per manufacturer's recommended Procedures via laser scattering. The scattering light from particles through laser scattering and polarization intensity differential scattering is collected as a function of angle, and subsequently converted to a particle size distribution.

In the present invention, powdered polyurethane, such as foams and elastomers of polyurethane, preferably ground recycled polyurethane foams, are used as in inner additive of a wide variety of redispersible polymer powders (RDPs), where the polyurethane foam powder particles are embedded within redispersible polymer particles to obtain a redispersible polymer powder composite or composition. The use of recycled polyurethane is beneficial on its own for the environment, improves overall performance of the cementitious mortar and also reduces the cost of the dry mix formulation. Additionally, there is no risk of demixing of the redispersible polymer powder and polyurethane foam powder during transport because the polyurethane foam powder is embedded within the redispersible polymer powder particles. The redispersible polymer composites may be used as an additive, to prepare new cementitious construction materials having improved overall performance of cementitious compositions or mortar, in applications such as cement based tile adhesives (CBTA), or external thermal insulating composite systems (ETICS) based coat applications. The use of the powdered polyurethane with a water insoluble film-forming polymer to obtain a redispersible polymer powder composite unexpectedly maintains excellent workability and quick open time, and can provide as good as or an increase in wet mortar density, as good as or quicker setting times, as good as or improved impact resistance, and increased adhesion after water immersion. For example, when the chemistry of the polymer is a carboxylated latex, replacement of a portion of the water insoluble film-forming polymer with a ground polyurethane rigid foam to obtain a redispersible polymer powder composite, increases the quick open time, reduces the setting time, increases the tensile adhesive strength, and increases open time of the mortar compared to an RDP which does not contain the ground polyurethane rigid foam as an inner additive. When ground polyurethane flexible foam is employed instead of ground polyurethane rigid foam, tensile adhesion strength and open time are about the same or somewhat lower compared to an RDP which does not contain the ground polyurethane flexible foam as an inner additive.

The ground or powdered polyurethane employed in the present invention may be prepared by grinding any conventional rigid, semi-rigid, or flexible polyurethane foam or elastomer into a powder. Mixtures of different ground polyurethanes may be employed in the present invention, including mixtures of ground polyurethane rigid foams with ground powdered polyurethane elastomers and/or polyurethane flexible foams. Powders prepared from rigid polyurethane foams are preferred as they have been found to provide unexpected improvements in, properties or performance of cementitious compositions compared to the use of ground polyurethane flexible foams, and the use of RDPs which do not contain any polyurethane foam as an inner additive. Suitable polyurethanes (PUR and PU) which may be employed is any polymer composed of a chain of organic units joined by carbamate (urethane) links that is foamed or which forms an elastomer. Exemplary polyisocyanate which may be employed in conventional amounts for the polyurethane foams or elastomers used in the present invention are aromatic diisoryanates, such as diphenylmethane diisocyanate (MDI) or toluene diisocyanate (TDI), aliphatic diisocyanates, such as hexamethylene diisocyanate (HDI) or isophorone diisocyanate (IPDI), and polymeric isocyanates such as polymeric diphenylmethane diisocyanate, which is a blend of molecules with two-, three-, and four- or more isocyanate groups, with an average functionality of 2.7. Conventional polyols for producing rigid or flexible polyurethane foams may be employed in conventional amounts for the production of polyurethane foams for use in the present invention. Exemplary of such polyols are glycerin, and trimethylolpropane (TMP), polyether glycols, such as base-catalyzed addition products of propylene oxide (PO), or ethylene oxide (EO) onto a hydroxyl or amine containing initiator, and polyester polyols such as polyesterification products of a di-acid, such as adipic acid, with a glycol, such as ethylene glycol or dipropylene glycol (DPG). Polyols extended with PO or EO are polyether polyols. Polyols formed by polyesterification are polyester polyols. Softer, elastic, and more flexible polyurethanes result when linear difunctional polyether polyols, e.g. polyethylene glycols are used to create the urethane links. Flexible polyurethane foams are generally produced using tri-functional polyols. However, more rigid products result if polyfunctional polyols are used, as these create a three-dimensional cross-linked structure which can be in the form of a low density foam. Elastomeric polyurethanes comprise the reaction product of a diol or difunctional polyether polyol with a diisocyanate or a polyisocyanate. Commercially available polyurethane foams and elastomers may be ground for use in the present invention, but commercially available recycled polyurethane foam or elastomer powders are preferably employed. Commercially available polyurethane foams or elastomers which may be employed in the present invention may include conventional additives such as chain extenders, cross linkers, surfactants, flame retardants, blowing agents, pigments, and fillers, in conventional amounts.

Conventional catalysts, blowing agents, and surfactants may be used in conventional amounts to make the polyurethanes for use in the present invention.

There are then two main foam variants: one in which most of the foam bubbles (cells) remain dosed, and the gas(es) remains trapped, the other being systems which have mostly open cells, resulting after a critical stage in the foam-making process (if cells did not form, or became open too soon, foam would not be created). If the flexible foams have closed cells, their softness is severely compromised, they become pneumatic in feel, rather than soft; so, generally speaking, flexible foams are required to be open-celled. The opposite is the case with most rigid foams. Here, retention of the cell gas is desired since this gas, especially the fluorocarbons, gives the foams their key characteristic of a high thermal insulation performance. In the present invention, to obtain the beneficial contribution from the recycled polyurethane foam powder, the original polyurethane foam is preferably rigid, so preferably the foams are close-celled and the polyol employed is polyfunctional. A powdered polyurethane which is not produced from a polyurethane foam may be employed by grinding or powdering non-foamed polyurethanes, such as elastomers, or polyurethanes which are made without a blowing agent to obtain a non-sticky, free-flowing powder which can be dispersed in water or in a latex and spray dried with conventional RDP components. A powdered polyurethane which is not produced from a foam, may be used alone or in combination with a powdered polyurethane foam in average particle sizes and amounts as employed for powdered polyurethane foams alone.

Commercially available recycled polyurethane foam or elastomer powders which may be employed in the redispersible polymer powder composites for use in hydraulic binders or cementitious compositions and additives, such as cement additives, of the present invention are produced by Mobius Technologies, Lincoln, Calif. The recycled polyurethane foam powders may be produced from scrap polyurethane foam or elastomers from manufacturing, cutting or post consumer sources, slabstock polyurethane foam, molded polyurethane foam, foam mattresses, car seats, or other rigid or flexible, polyurethane foam feedstock. The polyurethane foam or elastomer may be turned into an ultrafine powder by, for example, a shredding step in which foam or elastomer is reduced to pieces about the size of popcorn, followed by a grinding step in which the shredded pieces are reduced in a roll mill to an ultrafine powder. The powder may be passed through a sifter in which coarse particles are separated for recycling back to the roll mill. The powdered polyurethane foam or elastomer may be coated, with a coating agent such as a silica, but uncoated powders are preferred for their lower cost.

The average particle size of the ground polyurethane foam or elastomer employed in the present invention may generally be from 5 microns to 500 microns, for example from 10 microns to 200 microns, preferably from 20 microns to 150 microns, most preferably from 40 microns to 120 microns, for example from 40 microns to 80 microns.

The amount of the powdered polyurethane foam or elastomer employed in the redispersible polymer powder composite of the present invention may be from 1% by weight to 99% by weight, preferably from 20% by weight to 70% by weight, more preferably from 40% by weight to 60% by weight, for example 50% by weight, based upon the total weight of the water-dispersible polymer powder composite, or final powder composition.

The amount of the redispersible polymer powder composite of the present invention employed, may generally be 0.1% by weight to 10% by weight, preferably from 0.5% by weight to 3% by weight, based upon the weight of the dry mix formulation or cementitious composition.

The redispersible polymer powder composite may be admixed with the hydraulic binder ingredients, such as cement ingredients, to obtain a dry mix formulation of the present invention in conventional manner for the incorporation of an RDP into a dry mix formulation.

Water redispersible polymer powders containing a powdered polyurethane as an internal additive may be conventional, known RDPs which include a co-dried admixture of a water insoluble film-forming polymer and an optional colloidal stabilizer, which are prepared in known, conventional manner. The polymers which may be employed in the present invention may include, for example, water insoluble film-forming polymers, which may be prepared in known or conventional manner. Exemplary of homopolymers or copolymers which may be used as the water insoluble film-forming polymers are vinyl acetate homopolymers, copolymers of vinyl acetate with ethylene, copolymers of vinyl acetate with ethylene and one or more further vinyl esters, copolymers of vinyl acetate with ethylene, copolymers of vinyl acetate with ethylene and vinyl chloride, and styrene-1,3-butadiene copolymers. The film-forming polymers may be at least one polymer prepared from at least one ethylenically unsaturated monomer, such as a styrene butadiene copolymer, a styrene butadiene copolymerized with other comonomers such as vinyl comonomers, a vinylacetate ethylene (VAE) copolymer, a VAE/VA-VeoVA copolymer mixture (vinyl acetate ethylene copolymer/vinyl acetate-vinyl ester of versatic acid copolymer mixture), a polyurethane, a polyolefin, or cellulose. Other polymers that are film forming but less water insoluble may be used, such as cellulose, cellulose ethers like alkyl celluloses and hydroxyalkyl celluloses and those useful as colloidal stabilizers, as well as modified cellulases like hydrophobically modified cellulose ethers such as the reaction products of the above-stated cellulose ethers with hydrophobically modified glycidyl ethers, which have alkyl residues with $C_3$ to $C_{15}$ carbon atoms or arylalkyl residues with $C_7$ to $C_{15}$ carbon atoms.

The water-insoluble film-forming polymers may be prepared in conventional manner from ethylenically unsaturated monomers, such as vinyl monomers. Exemplary of water-insoluble film-forming polymers which may be used are vinyl homopolymers or vinyl acetate, styrene/butadiene and mixtures thereof.

Exemplary monomers which may be employed are vinyl esters, such as vinyl acetate; and vinylaromatic monomers, such as styrene. These monomers may be copolymerized with one another or with other ethylenically unsaturated monomers.

Exemplary of monomers which can be copolymerized with vinyl acetate and/or styrene to obtain water insoluble film forming polymers for use herein are ethylene and olefins such as isobutane; the vinyl esters of saturated, branched or unbranched monocarboxylic acids having from 1 to 12 carbon atoms, such as vinyl propionate, the esters of unsaturated mono- or dicarboxylic acids possessing 3 to 6 carbon atoms with alkanols possessing 1 to 10 carbon atoms, such as methyl, ethyl, butyl and ethylhexyl maleates and fumarates; vinylaromatic monomers such as methylstyrenes and vinyltoluenes; vinyl halides such as vinyl chloride and vinylidene chloride, and diolefins, such as butadiene.

Suitable water insoluble film-forming polymer may have a surface which is carboxylated, in conventional amounts. The water insoluble film forming polymer preferably is carboxylated, particularly for highly hydrophobic polymers such as styrene butadiene copolymers, for redispersibility. The amount of carboxylation may generally be from 0.1% to 15% by weight, for example from 0.5% by weight to 5% by weight, of at least one ethylenically unsaturated monocarboxylic acid, dicarboxylic acid, salts thereof, or mixtures thereof, based upon the total comonomer weight or the weight of the water insoluble film forming polymer, such as a styrene butadiene copolymer with itaconic acid.

The water insoluble film forming polymers used to obtain the redispersible polymer powder composites may comprise carboxylated copolymers of vinyl aromatic comonomers and 1,3-diene comonomers. The water insoluble film forming polymers may have a controlled distribution and degree of neutralization of the carboxylic groups which is obtained in known manner.

Examples of vinylaromatic comonomers which may be used are styrene, alpha-methylstyrene, $C_1$-$C_4$alkyl-styrenes such as o-vinyltoluene and tert-butylstyrene, with styrene being preferred. Examples of 1,3-dienes which may be used are 1,3-butadiene and isoprene, with 1,3-butadiene being preferred. Examples of comonomers which may be used are ethylenically unsaturated mono- and dicarboxylic acids and their salts, such as fumaric acid, maleic acid and/or itaconic acid. Dicarboxylic acids or their salts, particularly itaconic acid, fumaric acid, their salts and combinations thereof, are preferred.

The amount of carboxylic groups in the polymer that are located at the surface of the polymer particles in the powder, and the amount of carboxylic groups that are present in their salt form in the polymer powder may be controlled so that at least 50%, preferably at least 60%, more preferably at least 70% of the total number of carboxylic groups present in the polymer are located at the surface of the polymer particles in the powder and at least 75%, preferably at least 85%, more preferably at least 90%, and most preferably at least 95% of the carboxylic groups in the powder are present in their salt form. Useful cations in the carboxylic acid salts are ammonium, alkali metal ions and alkaline earth metal ions.

A high percentage of the carboxylic groups located at the surface of the polymer particles in the powder can be obtained: a) by the sole use of one or more ethylenically unsaturated dicarboxylic acid(s) as the comonomer, such as fumaric or itaconic acid or combinations thereof, or b) by staged monomer feeding, such as addition of the comonomer at an advanced stage of the polymerizations, for example when 60% by weight or more of the monomers are polymerized or c) by conducting the polymerization at a certain pH, for example at a pH of 2 to 9, preferably at a pH of 2 to 6.

Examples of optional comonomers which may be employed in the water insoluble film-forming polymers are ethylenically unsaturated crosslinking comonomers, such as comonomers with two or more ethylenic unsaturations, such as divinyl benzene, divinyl adipates, diallyl maleate, or triallyl cyanurate, or postcrosslinking comonomers, such as allyl N-methylolcarbamate, alkyl ethers, such as isobutoxy ether, or esters of allyl N-methylol-carbamate. Other examples of comonomers which may be used are silicon-functional comonomers, such as vinyltrialkoxysilanes and vinylmethyldialkoxysilanes. Examples of alkoxy groups which may be present include ethoxy radicals and ethoxy (propylene glycol) ether radicals.

The polymer may comprise: a) from 20% to 79.9%, preferably from 30% to 70%, of the one or more vinyl aromatic comonomers b) from 20% to 79.9%, preferably from 20% to 60% of the one or more 1,3-diene comonomers, c) from 0.1% to 15%, preferably from 0.5% to 10%, of the one or more ethylenically unsaturated mono-and di-carboxylic add comonomers, and d) from 0 to 40%, preferably from 0 to 20% of the one or more additional comonomers, based on the total weight of the copolymer. Most preferably, the polymer comprises from 50 to 70 percent of comonomer a), from 25 to 49 percent of comonomer b), and from 1 to 5 percent of comonomer c).

Also, a basic compound may be employed in an aqueous polymer dispersion of the water insoluble film-forming polymer to convert the majority of the carboxylic acid groups or carboxylic acid anhydride groups in the polymer into the salt form of the acid groups. The amount of the basic compound included may be: 1) equivalents of at least 0.5, preferably from 0.6 to 1.2, more preferably from 0.7 to 1.1, most preferably from 0.8 to 1.0 of a basic compound per equivalent of carboxylic groups in the polymer, or 2) a basic compound sufficient to adjust the pH of the dispersion to at least 95, preferably at least 10.0, more preferably at least 10.5, and preferably up to 12.5, more preferably up to 12.0, most preferably up to 11.5. The basic compound is preferably an inorganic basic compound, more preferably a strong inorganic basic compound, particularly an alkali metal hydroxide or an alkaline earth metal hydroxide, such as NaOH, KOH, LiOH, $Mg(OH)_2$ or $Ca(OH)_2$. Most preferably, the basic compound is an alkali metal hydroxide, such as sodium hydroxide or potassium hydroxide.

The film-forming polymers may have a glass transition temperature of from −60° C. to +80° C., preferably from 20° C. to +50° C., more preferably from −10° C. to +30° C. The monomers and the proportions by weight of the comonomers may generally be chosen to obtain a desired glass transition temperature. The glass transition temperature Tg of the polymers can be determined in a known manner by means of differential scanning calorimetry (DSC).

In accordance with the present invention, the water insoluble film-forming polymer in the aqueous dispersion or latex which is to be spray dried may have an average particle size of from 20 nm to 500 nm, preferably from 100 nm to 400 nm most preferably from 150 nm to 300 nm.

The aqueous dispersions or latex, which refers generically to a stable dispersion or emulsion of polymer microparticles in an aqueous medium, obtained in the present invention may generally have a solids content of from 30 to 75% by weight, for example between 35% and 65% by weight, preferably from 40 to 60% by weight.

Conventional colloidal stabilizers in conventional amounts may be employed in the production of the redispersible polymer powder composites. Exemplary of colloidal stabilizers which may be used are polyvinyl alcohols; polyvinyl acetals; polyvinylpyrrolidones; polysaccharides in water-soluble form, e.g. starches (amylose and amylopectin), celluloses and their carboxymethyl, methyl, hydroxyethyl and hydroxypropyl ethers; proteins such as casein or caseinate, soy protein, gelatins; lignin sulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthaleneformaldehyce sulfonates, and styrene-maleic add and vinyl ether-maleic add copolymers. Generally, the preferred colloidal stabilizer employed is a polyvinyl alcohol (PVOH), such as MOWIOL 4-88, MOWIOL 8-88, MOWIOL 13-88 and MOWIOL 18-88, which are each commercially available from Kuraray Europe GmbH, Division PVA/PVB D-65926 Frankfurt am Main, Germany and have a viscosity DIN 53015 ranging from 2±0.5 mPa·s to 18±0.5 mPa·s (4% aqueous solution at 20° C.) or more, a degree of hydrolysis (saponification) of 87.7±1.0 mol. %, an ester value DIN 53401 of 140±10 mg KOH/g, a residual acetyl content of 10.8±0.8 w/w %, and a maximum ash content of 0.5% (calculated as $Na_2O$).

The colloidal stabilizer, such as polyvinyl alcohol alone, or in combination with another colloidal stabilizer may be employed in an amount of at least 0.1% by weight, generally at least 2% by weight, for example from 5% by weight to 35% by weight, based upon the weight of the water insoluble film-forming polymer.

The redispersible polymer powder composites of the present invention may be prepared, in conventional manner for the production of RDPs, from an aqueous dispersion comprising the water insoluble film-forming polymer, the powdered polyurethane foam, an optional colloidal stabilizer such as polyvinyl alcohol, and other optional components. To prepare the redispersible polymer powder composite, the aqueous dispersion is dried, for example by spray drying, freeze drying or fluidized-bed drying. Preferably the aqueous dispersion is spray dried in conventional manner. Further additives such as surfactants and defoamers, and fillers may be employed, if desired, and the further additives are preferably added in conventional amounts to the aqueous dispersion before drying. For example, an antifoamer may be employed in an amount of up to 1.5% by weight, based on the weight of the polymer particles. Conventional superplasticizers may be employed in an amount of at least 0.01% by weight, preferably from 5% by weight to 15% by weight, based upon the weight of the water redispersible polymer powder composite.

The spray drying can take place in conventional spray drying systems, for example a dispersion may be atomized by using single, twin or multifluid nozzles or a rotating disk in a stream of drying gas which may be heated. In general, air, nitrogen or nitrogen enriched air is employed as the drying gas, the drying gas temperature generally not exceeding 250° C. The drying temperature preferably is from 110 to 180° C., more preferably from 130 to 170° C. The product outlet temperature may generally be from 30° C. to 120° C., preferably from 40° C. to 90° C., depending on the plant, the $T_g$ of the polymeric composition, and the desired degree of drying.

An anticaking agent (antiblocking agent) may be added to the polymer powder to increase storage stability, for example in order to prevent caking and blocking and/or to improve the flow properties of the powder. This addition is preferably carried out as long as the powder is still finely dispersed, for example still suspended in the drying gas. The anticaking agent is preferably of mineral origin. It is preferably added in an amount of up to 40% by weight, based on the total weight of polymeric constituents. Examples of anticaking agents include but are not limited to kaolin, calcium carbonate, magnesium carbonate, talc, gypsum, silica and silicates, and mixtures thereof. The particle sizes of the anticaking agents are preferably in the range of from 100 nm to 10 μm. A preferred anticaking agent is kaolin. The anticaking agent is optional, and its amount may be reduced or eliminated by inclusion of the powdered polyurethane as an internal additive of the redispersible polymer powder.

The X50 size of the particle size distribution of the redispersible polymer powder composite depends on drying conditions and drying equipment. X50 represents the median diameter in micrometers, which means that 50% by weight of the particles are smaller than this diameter. For example, the produced water-redispersible polymer powder composite may have an X50 particle size diameter of from 5 to 150 micrometers, preferably from 20 to 90 micrometers, most preferably from 50 to 80 micrometers. The particle size distribution of the powder can be measured by laser diffraction using a particle size analyzer "Sympater Helos" at a measuring range of 1.8-350 μm and dispersing the powder by compressed air.

The weight of the polymer particles in the redispersible polymer powder composite, for example, weight of the water insoluble film-forming polymer described herein in the redispersible polymer powder composite, may be from 1% by weight to 99% by weight, preferably from 40% by weight to 90% by weight, more preferably from 50% by weight to 80% by weight, of the total weight of the water-redispersible polymer powder composite, or final powder composition.

The redispersible polymer powder composites, which may have an average particle size of from 20 micrometers to 150 micrometers, preferably from 20 μm to 90 μm, most preferably from 50 μm to 80 μm, may be readily dispersed into deionized water.

The water redispersible polymer powder composites of the present invention have a variety of uses in building materials which comprise an inorganic hydraulic binding agent or cementitious composition. Thus, the present invention is also directed to a composition comprising an inorganic hydraulic binding agent or binder, and water redispersible polymer powder composites, or hydraulic binder additive, or cement additive as described above. Typically, the inorganic hydraulic binding agent or hydraulic binder is cement or calcium sulfate hemihydrate (plaster of Paris), preferably cement. Examples of suitable cements include Portland cement, alumina cement, pozzolanic cement, slag cement, magnesia cement and phosphate cement.

The ability to add the redispersible polymer powder composite to a building provides a composition which is a ready-to-use dry mix. The redispersible polymer powder composite can already be mixed with the hydraulic binding agent and additional components such, as for example, sand to produce a one-component system for the end user. At the construction site only water has to be added and no annoying dosing of other ingredients is necessary. Typical building materials wherein the redispersible polymer powder of the present invention may be used are one-component dry mixes containing an inorganic hydraulic binding agent, preferably a one-component cement-containing dry mix. More specific illustrative examples of building materials wherein the additive can be used include mortars, tile or board adhesives, gypsum or cement plasters or renders, decorative renders, self-leveling flooring compositions, one-component sealants and exterior insulation finishing systems. The corresponding hardened building materials obtained from materials including the redispersible polymer powder composite of the present invention exhibit good adhesion strength also after immersion in water (water resistance).

The redispersible polymer powder composite containing the powdered polyurethane as an internal additive of an RDP may be employed in blends with one or more redispersible polymer powders (RDPs), such as VAE RDPs, VAE/VA-VeoVA RDPs polyurethane RDPs, polyolefin dispersion based RDPs, styrene butadiene RDPs, and mixtures thereof. The redispersible polymer powder composites of the present invention may be employed as functional additives in compositions such as construction materials, personal care compositions, agricultural compositions, in high salt concentration applications or environments, such as off-shore oil well cementing, oil and gas drilling and cementing and in hard water. Additional uses of the powders are in waste management applications, such as compositions for synthetic covers for bulk material piles, such as waste, coal sludge containment, soil, soil erosion control, which minimize water infiltration, nuisance fugitive dust, odor, and affinity to birds. The powders may be used in alternative landfill covers that are sprayable, use inexpensive widely available and environmentally friendly recycled materials, have good adherence to plastics and glass waste, and can form/harden within a short time, and in adhesion enhancing admixtures. The powders may also be employed in the production of foams, such as polyurethane foams.

Preferably, the water-redispersible polymer powder composite may be used as an additive in a setting composition which may further include an inorganic hydraulic binder. Examples of inorganic binders include cements, such as Portland cement, alumina cement, pozzolanic cement, slag cement, magnesia cement and phosphate cement; gypsum hemihydrate and water-glass. Illustrative uses of the redispersible polymer powder composite or polymer composition according to the present invention are in tile adhesives, construction adhesives, renders, joint mortars, plasters, troweling compositions, filling compositions, such as floor filling compositions (e.g. self-leveling flooring compounds), concrete repair joints, joint mortars, tape joint compounds, concrete, water proofing membrane applications, crack isolation membrane applications, and additives for ceramic processing. In particular, the use of the water-redispersible polymer powder composite described herein in a setting composition, e.g. in cement-based tile adhesives or in external thermal insulation composite systems, result in compositions with high initial adhesion strength, high adhesion strength after immersion in water (water resistance), and high adhesion strength after allowing a certain "open time" before final application of the hydrated setting composition. The redispersible polymer powder composite may be employed as a binder for slip casting, of for example raw materials such as silica, alumina, alkali metal oxides, and alkaline earth metal oxides.

A preferred use of the redispersible polymer powder composite is in cementitious or hydraulic compositions or other compositions which exhibit a high pH, for example a pH of at least 11, for example from 11.5 to 13.5. The composite of the present invention may be employed in mortar repair or grout compositions, tile adhesives, such as cement-based tile adhesives. Cement-based the adhesives may generally comprise 5 to 50 parts by weight of cement, preferably Portland cement, as the hydraulic binder; 40 to 70 parts by weight of quartz sand, preferably having a particle size of from 0.1 mm to 0.5 mm, as the main filler, and 0.1% to 10% by weight, preferably 1% to 6% by weight (based on the dry weight of the tile adhesive) of the redispersible polymer powder composite according to the present invention. Further optional components include one or more cellulose ethers (preferably in a total amount of 0.05% to 1% by weight, more preferably 0.2% to 0.5% by weight, based on the dry weight of the tile adhesive) to control rheology, water retention, slip resistance and improved workability; quartz or lime stone powder having a particle size of from 30 μm to 60 μm as fine co-filler to improve consistency and workability; and cellulose or mineral fibers to improve the slip resistance.

Another use of the redispersible polymer powder composite is in self-leveling flooring compounds (SLFC). The powders may be added to improve the adhesion to the substrate, the flexibility, the abrasion resistance and the aging properties. The SLFC may generally include the same components in the same amounts as employed in the CBTAs. A retarder or retardant, such as trisodium citrate (TriNa-Citrate), such as Censperse PC13 available from Newchem AG, Pfäffikon, Switzerland, may be employed in conventional amounts generally employed in SLFC. The SLFC may also include calcium sulfate (gypsum), an accelerator, such as lithium carbonate, and a liquefier, dispersant, or superplasticizer, such as a water soluble co-polymer dispersant, such as MELFLUX 2651F, which is based on modified polycarboxylate technology and produced by BASF Construction Polymers, Kennesaw Ga., in conventional amounts. The redispersible polymer powder composite may also be used in external thermal insulation systems ETICS, particularly as an adhesive on the thermally insulating board layer to reduce the water absorption and improve the impact resistance of the external thermal insulation system. Such compositions may include 15% to 45% by weight cement, and 0.01% to 0.7% by weight of at least one cellulose ether.

Furthermore, the redispersible polymer powder composite according to the present invention may be used in paper products, paperboard products, carpet backing, paints or coatings or in binders for wood, paper or textiles coatings or impregnating compositions, preferably in the absence of a substantial amount of an inorganic hydraulic binding agent, more preferably in the absence of any amount of an inorganic hydraulic binding agent. For example, the composite powders may be used as the sole binder in coating compositions and adhesives. The redispersible polymer powder composites may also be used in automotive applications.

The following examples are provided for illustrative purposes only and are not intended to limit the scope of the claims that follow. Unless otherwise indicated, all parts and percentages are by weight, all temperatures are in ° C., and all pressures are in bars or atmospheric unless otherwise indicated to the contrary.

EXAMPLE 1

In this Example, two redispersible polymer powder composites containing recycled polyurethane rigid foam powder (RPU) in combination with two different styrene-butadiene water insoluble film-forming polymers (base polymers or latex) are evaluated in external cement based tile adhesives (CBTA) for quick open time, adhesion, workability, impact resistance, and water uptake. For one of the redispersible polymer composites, the styrene-butadiene water insoluble film-forming polymer has a comonomer content of 62 parts styrene, 35 parts butadiene, and 3 parts itaconic acid (a carboxylation of 3% by weight of itaconic acid, based upon the total comonomer weight), and a $T_g$ of 8° C. For the other redispersible polymer composite, the styrene-butadiene water insoluble film-forming polymer has a comonomer content of 51.6 parts styrene, 45.4 parts butadiene, and 3 parts itaconic acid (a carboxylation of 3% by weight of itaconic add, based upon the total comonomer weight), and a $T_g$ of −15° C. An SB RDP formulation without the recycled polyurethane rigid foam powder as an internal additive is also evaluated for comparison using the styrene-butadiene water insoluble film-forming polymer which has a comonomer content of 62 parts styrene, 35 parts butadiene, and 3 parts itaconic acid (a carboxylation of 3% by weight of itaconic acid, based upon the total comonomer weight), and a $T_g$ of 8° C.

The redispersible polymer powder composites of the present invention may be produced by admixing: a) a water insoluble film forming carboxy laud styrene butadiene (SB) latex, and b) 20% by weight of a powdered recycled polyurethane rigid foam (MPU 300-2/300 having an X-50 particle size of 100 μm and being treated with 3% by weight of silica), based upon the weight of the latex polymer. The mixture is prepared by admixing the powdered recycled polyurethane rigid foam with the latex dispersion, and stirring to obtain a homogeneous mixture.

This mixture may be pumped to a two-fluid nozzle atomizer equipped on a NIRO mobile spray dryer. The air pressure to the nozzle may be 80 kg/hr of airflow, and the water evaporation may be 1 kg/hr. The spray drying may be conducted in an air environment with an inlet temperature fixed at 130° C., and the outlet temperature may be targeted to 50° C.±1° C. by tuning the feed rate of the mixture. Concurrently, kaolin powder (KaMin HG 90) may be added into the chamber for spray drying as an anti-caking agent, with the amount being controlled to be 12% by weight of the dry powders.

The comparative SB RDP formulation may be produced by pumping the water insoluble film forming carboxylated styrene butadiene (SB) latex to a two-fluid nozzle atomizer equipped on a NIRO mobile spray dryer. The air pressure to the nozzle may be 80 kg/hr of airflow, and the water evaporation may be 1 kg/hr. The spray drying may be conducted in an air environment with an inlet temperature fixed at 130° C., and the outlet temperature may be targeted to 50° C.±1° C. by tuning the feed rate of the mixture. Concurrently, kaolin powder (KaMin HG 90) may be added into the chamber for spray drying as an anti-caking agent, with the amount being controlled to be 12% by weight of the dry powders. The formulations and the results of the evaluations are shown in Tables 1, 2, and 3, below:

TABLE 1

Composition of Tested Samples

| Sample | A (RDP Comparative) | B Composite | C Composite |
| --- | --- | --- | --- |
| Base Polymer | Styrene-butadiene with itaconic acid (62/35/3) | Styrene-butadiene with itaconic acid (62/35/3) | Styrene-butadiene with itaconic acid (51.6/45.4/3) |
| Tg of Base Polymer | 8° C. | 8° C. | −15° C. |
| Powdered Recycled Polyurethane Rigid Foam[1], wt. % | None | 20% | 20% |
| Anti-caking agent (kaolin), weight % | 12% | 12% | 12% |

[1]X-50 particle size of 100 μm treated with 3% by weight of silica (MPU 300-2/300).

TABLE 2

Cement-based Dry Mortar Formulation

| RAW INGREDIENT | Wt % |
| --- | --- |
| Portland Cement Type 1 42.5 | 35.00 |
| Quartz Sand F32 (Quarzwerke Frecheen) | 31.60 |
| Quartz Sand F36 (Quarzwerke Frecheen) | 30.00 |
| RPU -SB Composite or SB RDP of Samples A to C of Table 1 | 3.00 |
| WALOCEL MKX40000 PF 01 hydroxyethyl methyl cellulose (HEMC) Dow Wolff Cellulosics, Viscosity (2%) = 49390 mPA · s | 0.40 |
| Total Dry Mix | 100.00 |

TABLE 3

Results for Evaluation of Recycled PU Foam Powder in CBTA

| | SAMPLE | | |
| --- | --- | --- | --- |
| Property or Test | A | B | C |
| Base Polymer | SB | SB | SB |
| | Tg +8° C. | Tg +8° C. | Tg −15° C. |

TABLE 3-continued

Results for Evaluation of Recycled PU Foam Powder in CBTA

| Powdered Recycled Polyurethane Rigid Foam, (MPU 300-2/300), weight % | -none- | 20% | 20% |
|---|---|---|---|
| Water demand | 0.24 | 0.25 | 0.25 |
| Tensile adhesion strength EN 1348 | [N/mm$^2$] | | |
| 28 days nc (23/50) | 0.83 | 1.07 | 0.94 |
| Water storage | 0.63 | 0.78 | 0.80 |
| Warm storage 70° C. | 0.77 | 0.79 | 0.67 |
| Freeze-thaw exchange | 0.64 | 0.89 | 0.91 |
| Open time EN 1346 | [N/mm$^2$] | | |
| 20 min. | 0.54 | 0.85 | 0.70 |
| 30 min. | 0.39 | 0.62 | 0.53 |
| Quick Open Time CE 48.1 | [%] | | |
| 5 min. | 100 | 100 | 100 |
| 10 min. | 95 | 100 | 100 |
| 15 min. | 90 | 95 | 95 |
| 20 min. | 50 | — | 80 |
| 25 min. | 35 | 50 | 50 |
| 30 min. | 10 | 10 | 10 |
| Workability | 1-2 | 1 | 1 |
| Setting with Vicat CE 94.1 | minutes | | |
| start | 998 | 985 | 941 |
| end | 1223 | 1190 | 1128 |
| duration | 225 | 205 | 187 |

The test methods employed in the evaluations are:

Test Specification CE-48.1—Determination of the Open Time of Tile Adhesives (Manual Stirring Test—Wetting Test)

The purpose of this test is to determine the time span within which the back of a can still be sufficiently wetted when laying the into a combed bed of tile adhesive. The principle is that tiles are laid into a combed bed of tile adhesive at 5 min. intervals and later removed. Subsequently the wetting of the rear of the is assessed.

Setting Time—Vicat (Dettki AVM-14-PNS)—CE 94.1

The mortar is mixed in accordance to EN-1348 after an appropriate maturing time. After mixing, the mortar is filled into the cup while being prodded lightly to prevent the presence of air voids. The sample is placed into the appropriate holder inside the penetrometer, the desired measuring program is selected and the test is started as described in the operating instructions. The penetrometer determines when setting begins (penetration depth: 36 mm) and when setting ends (penetration depth: 2 mm). The difference between the two times is the setting duration. If any measuring faults which might lead to false results are detectable on the graph, the time when setting begins and when it ends are to be corrected by interpolation, Determination of Open Time—EN 1346

This European Standard specifies the test method for the determination of the open time of ceramic tile adhesives. The standard is applicable to all ceramic the adhesives for internal and external the installations on walls and floors. After a 28 days storage under standard conditions determination of the tensile adhesion strength of the adhesive is done by applying a force which increases at a constant rate of (250±50) N/s. The open time in minutes, is the maximum time interval at which the adhesive meets the tensile adhesion strength requirement of 0.5 N/mm$^2$ (EN 12004) (Table 5), Determination of Tensile Adhesives Strength for Cementitious Adhesives—EN 1348

This European Standard specifies the test method for the determination of the tensile adhesion strength of cementitious ceramic tile adhesives. The standard is applicable to all ceramic the adhesives for internal and external tile installations on walls and floors. After a storage under different conditions determine the tensile adhesion strength of the adhesive by applying a force increasing at a constant rate of (250±50) N/s. Storage conditions according EN 1348 are: a) standard storage: 28 d 23° C./50% relative humidity, b) water immersion: 7 d standard Climate storage/20 d water immersion/1 d standard climate storage, c) heat ageing: 14 d standard climate storage/14 d storage at 70° C./1 d standard climate storage was not analyzed, and d) freeze thaw cycles: 7 d standard storage/21 d water immersion/25 freeze-thaw cycles (cooling down to −15° C. within 2 h, storage at −15° C. for 2 h, water immersion for 2 h, repeat 25 times).

EXAMPLE 2

In this Example, redispersible polymer powder composites containing two different recycled polyurethane flexible foam powders (MPU 200R and MPU 200R 3%) in combination with the two different styrene-butadiene water insoluble film-forming polymers (base polymers or latex) of Example 1 are evaluated in external cement based the adhesives (CBTA) for open time and adhesion as in Example 1. An SB RDP formulation without the recycled polyurethane rigid foam powder as an internal additive is also evaluated for comparison using the Example 1 styrene-butadiene water insoluble film-forming polymer which has a comonomer content of 62 parts styrene, 35 parts butadiene, and 3 parts itaconic acid (a carboxylation of 3% by weight of itaconic acid, based upon the total comonomer weight), and a Tg of 8° C. The recycled polyurethane flexible foam MPU 200R has an X-50 particle size of 80 to 120 μm and is treated with 10% by weight of silica. The recycled polyurethane flexible foam MPU 200R 3% has an X-50 particle size of 100 μm and is treated with 3% by weight of silica.

The redispersible polymer powder composites of the present invention and the comparative SB RDP formulation may be produced as in Example 1. The cement based dry mortar formulation employed is the same as in Example 1, Table 2 except the 3% by weight of the RPU-SB Composite or SB RDP of the Samples A to C of Table 1 are replaced by 3% by weight of the RPU-SB Composite or SB RDP of the Samples 1-7 shown in Table 4. The formulations and the results of the evaluations are all shown in Table 4:

TABLE 4

Results for Evaluation of Recycled PU Flexible Foam Powder in CBTA

| Formulation and Property or Test | SAMPLE | | | | | | |
|---|---|---|---|---|---|---|---|
| | 1 | 2 | 3 | 4 | 5 | 6 | 7 (Comp.) |
| Base Polymer Styrene-butadiene with itaconic acid (62/35/3) Tg +8° C., weight % | 68 | 68 | 78 | 58 | — | 60 | 88 |
| Base Polymer Styrene-butadiene with itaconic acid (51.6/45.4/3) Tg −15° C., weight % | | | | | 68 | | |
| Powdered Recycled Polyurethane Flexible Foam with 10% silica (MPU 200R), weight % | 20 | — | 10 | 30 | 20 | 20 | none |
| Powdered Recycled Polyurethane Flexible Foam with 3% silica (MPU 200R 3%), weight % | | 20 | | | | | none |
| Anti-caking Agent Kaolin, weight % | 12– | 12 | 12 | 12 | 12 | — | 12 |
| Anti-caking agent MPU 200R (replaces Kaolin), weight % | | | | | | 20 | |
| Water demand | 0.25 | 0.25 | 0.25 | 0.25 | 0.25 | 0.25 | 0.25 |
| Tensile adhesion strength EN 1348 1500 g dry mortar, resting time 10 minutes | [N/mm$^2$] | | | | | | |
| 6 days nc (23/50) | 1.15 | 1.24 | 1.22 | 1.18 | 1.19 | 1.10 | 1.19 |
| Open time EN 1346 | [N/mm$^2$] | | | | | | |
| 20   6 days 20 min. | 0.61 | 0.71 | 0.68 | 0.68 | 0.72 | 0.63 | 0.80 |
| 30   6 days 30 min. | 0.47 | 0.60 | 0.60 | 0.54 | 0.66 | 0.49 | 0.58 |

What is claimed is:

1. A water-redispersible polymer powder composite comprising a co-dried admixture of a water insoluble film-forming polymer, a colloidal stabilizer, and a powdered polyurethane foam, the amount of the powdered polyurethane foam being from 1% by weight to 99% by weight, based upon the total weight of the water-redispersible polymer powder composite, wherein the powdered polyurethane foam is a ground recycled rigid polyurethane foam having an average particle size of from 5 microns to 500 microns and the water-redispersible polymer powder composite has an average particle size of from 20 to 150 microns.

2. The water-redispersible polymer powder composite as claimed in claim 1 wherein the water insoluble film-forming polymer comprises a polymer prepared from a styrene and butadiene, a copolymer of styrene, butadiene and another comonomer, a vinylacetate ethylene (VAE) copolymer, a VAE/VA-VeoVA copolymer mixture, a polyurethane, a polyolefin, cellulose, a cellulose ether or a modified cellulose.

3. The water-redispersible polymer powder composite as claimed in claim 1 wherein the water insoluble film-forming polymer comprises a polymer prepared from styrene and butadiene, or a copolymer of styrene, butadiene and another monomer, or a vinylacetate-ethylene copolymer.

4. The water-redispersible polymer powder composite claimed in claim 1 wherein the amount of the powdered polyurethane foam is from 20% by weight to 70% by weight, based upon the total weight of the water-redispersible polymer powder composite.

5. A method for producing a water redispersible polymer powder composite comprising drying an aqueous mixture of a water insoluble film-forming polymer, a colloidal stabilizer, and a powdered polyurethane foam to obtain a water redispersible polymer powder composite, the amount of the powdered polyurethane foam being from 1% by weight to 99% by weight, based upon the total weight of the water-redispersible polymer powder composite, the powdered polyurethane foam being a ground recycled rigid polyurethane foam having an average particle size of from 5 microns to 500 microns, and the water-redispersible polymer powder composite having an average particle size from 20 to 150 microns.

6. The method for producing a water redispersible polymer powder composite as claimed in claim 5 wherein the water insoluble film-forming polymer comprises a polymer prepared from a styrene and butadiene, a copolymer of styrene, butadiene and another comonomer, a vinylacetate ethylene (VAE) copolymer, a VAE/VA-VeoVA copolymer mixture, a polyurethane, a polyolefin, a cellulose, or a cellulose derivative, the amount of the powdered polyurethane foam is from 20% by weight to 70% by weight, based upon the total weight of the water-redispersible polymer powder composite, and the powdered polyurethane foam has an average particle size of from 20 microns to 150 microns.

7. A dry mix composition comprising cement ingredients and the water redispersible polymer powder composite as claimed in claim 1 in an amount of at least 0.1% by weight, based upon the weight of the dry mix composition.

* * * * *